United States Patent
Miranda

[15] 3,643,741
[45] Feb. 22, 1972

[54] SEALING OF UNDERWATER FISSURES

[72] Inventor: Salvatore W. Miranda, P.O. Box 5746, Carmel, Calif. 93921

[22] Filed: Feb. 3, 1970

[21] Appl. No.: 8,197

[52] U.S. Cl. ................................166/295, 61/36 R, 166/.5, 61/1 F
[51] Int. Cl. .....................................E02d 3/14, E21b 33/13
[58] Field of Search .......................61/36, 1 R, 1 F, 46.5, 46, 61/35; 175/61, 62, 72, 5, 7, 8; 166/295, 285, .5, 75

[56] References Cited

UNITED STATES PATENTS

| 3,181,611 | 5/1965 | Dollarhide | 166/295 |
| 3,181,612 | 5/1965 | West et al. | 166/295 X |
| 3,236,671 | 2/1966 | Dybalski et al. | 61/36 R X |
| 3,252,290 | 5/1966 | Gagle et al | 61/36 R |
| 3,252,528 | 5/1966 | Nicolson | 175/7 X |
| 3,282,355 | 11/1966 | Henderson | 175/61 |
| 3,312,069 | 4/1967 | Jorda | 166/295 X |
| 3,446,027 | 5/1969 | Meijer | 61/1 R X |

*Primary Examiner*—Stephen J. Novosad
*Attorney*—Sokolski & Wohigemuth

[57] ABSTRACT

Oil flow from an open fissure on the ocean bottom is controlled by polymerizing in place in the fissure a resin composition which binds the oil or by placing a dome over the fissure to capture the oil. The dome may be tapped and the oil collecting in the dome recovered.

4 Claims, 3 Drawing Figures

PATENTED FEB 22 1972

INVENTOR.
SALVATORE W. MIRANDA

BY *Lindenberg & Freilich*

ATTORNEYS.

SEALING OF UNDERWATER FISSURES

BACKGROUND OF THE INVENTION

1. Field of the Invention

The present invention relates to the control of oil pollution of surface waters from fissures in the bottom floor of the ocean and more particularly this invention relates to various techniques of sealing the fissure.

2. Description of the Prior Art

The frequency and dangers of oil pollution has greatly increased in the past several years due to the use of super tankers and the off shore drilling in geologically faulted areas, such as the Santa Barbara Channel. An offshore well in the Santa Barbara Channel developed a fissure on Jan. 28, 1969 causing an oil slick which fouled beaches in Santa Barbara and Ventura Counties. The effect of the oil on marine life, birds and on the total ecological balance cannot be determined.

Efforts to stem the flow by pumping cement into the well were unsuccessful. Production from the well was reinitiated to relieve the pressure on the reservoir but oil continues to slowly seep into the channel.

The techniques available for controlling and removing the slick from surface waters are unsatisfactory. Dispersants and detergents are effective in eliminating much of the slick bur are feared because of the unknown effect on the ecological balance. Various adsorbent materials have been proposed to be applied to the slick to sink the oil to the bottom of the ocean. Again, this may drastically upset the ecological balance.

Another technique utilizes a treated silica which will act as a wick and permit burning of the slick. This is not effective in many circumstances and is dangerous, especially in the presence of a natural gas leak. For these reasons, the slicks have been mainly controlled by very primitive methods such as by skimming with pumps and by coagulating the oil with straw which is then removed and burned.

SUMMARY OF THE INVENTION

Oil flow from fissures on the ocean floor are controlled according to the invention by applying a sealant to the fissure. In one embodiment of the invention a resin-forming liquid is applied to the fissure and cures in place binding the oil to form a body of sealant adhering to the walls of the fissure and the surface of the ocean bottom surrounding the fissure. In another technique a secondary channel is drilled on a slant into the fissure at a location below the ocean floor and the resin liquid is pumped through the slanted channel to seal the fissure below the ocean floor. In a further embodiment of the invention a dome is placed over the fissure and anchored and sealed to the floor to stop the leakage of the oil. A pipe may be topped into the dome to remove the collected oil.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figure 1:
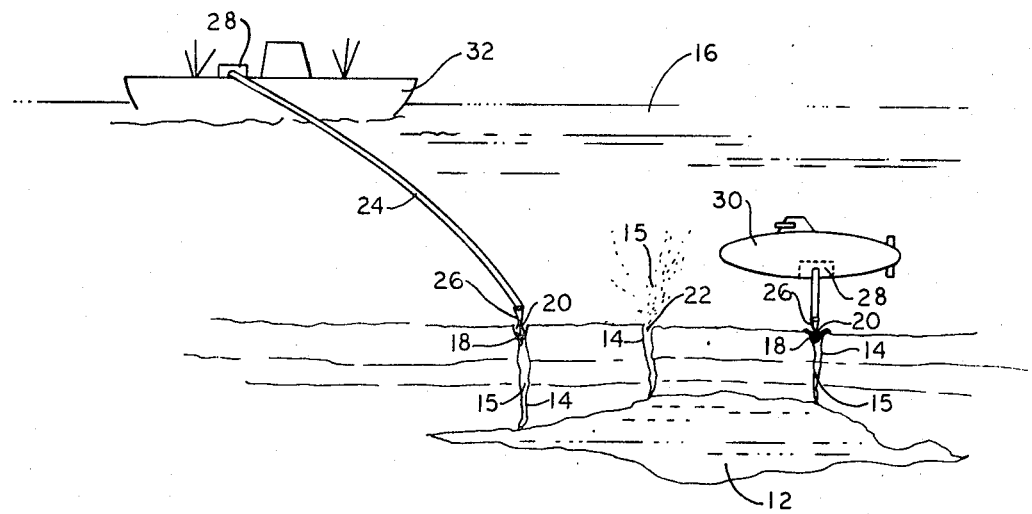
FIG. 1 is a schematic view of a first system for sealing fissures.

Referring now to FIG. 1, a portion of the ocean bottom 10 overlying a pool 12 of oil is illustrated. Fissures 14 have developed and oil 15 escaping from the fissure rises to the surface 16 of the water to form an oil slick. A sealant plug 18 is formed in the fissure by applying resin forming liquid to the open end 22 of the fissure 14 from a hose 24 terminating in a nozzle 26. In the case of a two-part liquid resin forming system, hose 24 is coaxial and the liquids mix in nozzle 26 just before being applied to the opening 22.

The hoses 24 are supplied from a liquid supply apparatus 28 which may be carried by a submersible craft 30, such as a 1 or 2 man or larger submarine or by a surface ship 32. The supply apparatus can include separate containers of the resin forming liquids and a compressor to apply a sufficient pressure to the containers to force the liquids through the hose 24 and dispense the liquids into the opening 22. Many different types of commercially available liquid dispensing systems are suitable for use in accordance with the invention.

Figure 2:
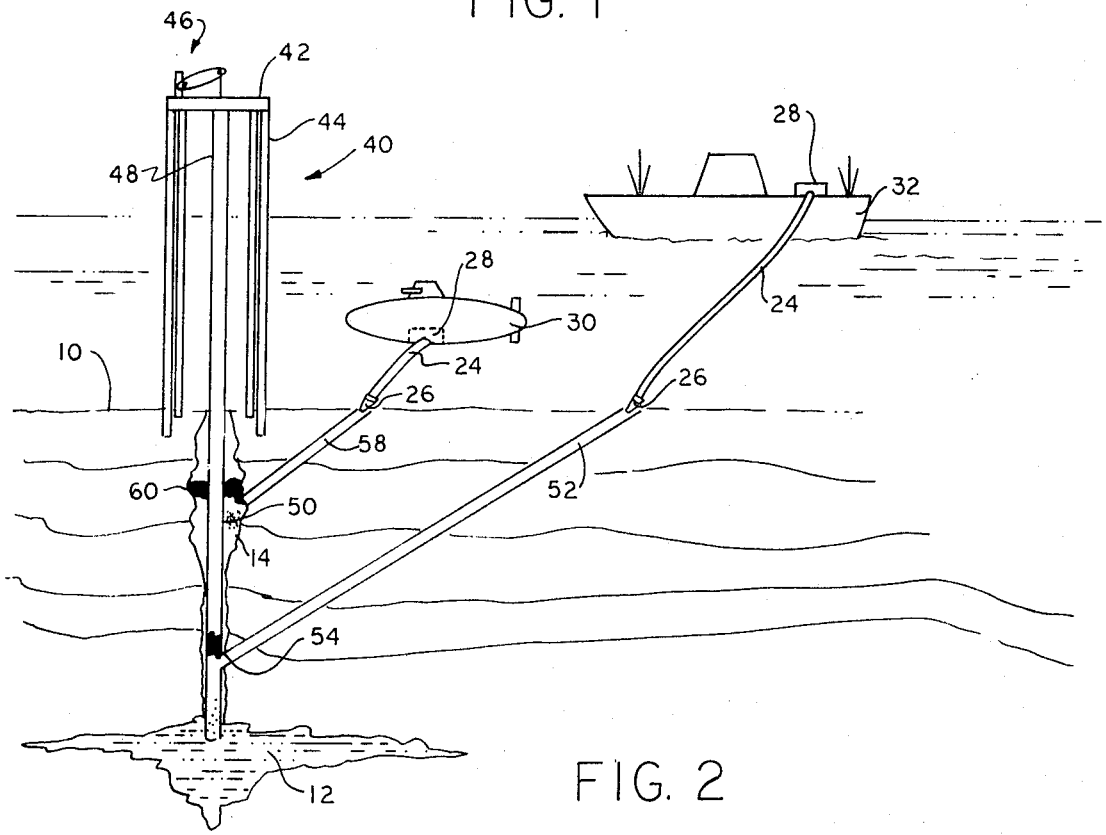
FIG. 2 is a schematic view of another system for sealing oil fissures.

FIG. 2 illustrates sealing oil leaks associated directly with an offshore oil well. The well 40 includes a platform 42 supported on pilings 44 which are seated in the ocean floor 10. A pump 46 is supported on the platform over the well casing 48. The casing 48 lines the hole bored into the oil pool 12. A fissure 14 has developed adjacent the casing 48.

In the case of a break 50 in the casing 48 causing leakage into the fissure 14, a slant hole 52 is bored into the casing 48 at a location below the break 50. The nozzle 26 of the hose 24 is inserted into the slant hole 52 and the resin-forming liquid is pumped through slant hole 52 into the casing to form a plug 54 which seals off the leak. After the break 50 in the casing 48 is repaired, the plug can be drilled out and the well returned to a producing status.

If the fissure 14 penetrates into the well pool causing oil leakage, a slant hole 58 can be drilled into the fissure 14 and liquid pumped from nose 24 into the fissure to form a plug 60 which seals the fissure.

Figure 3:
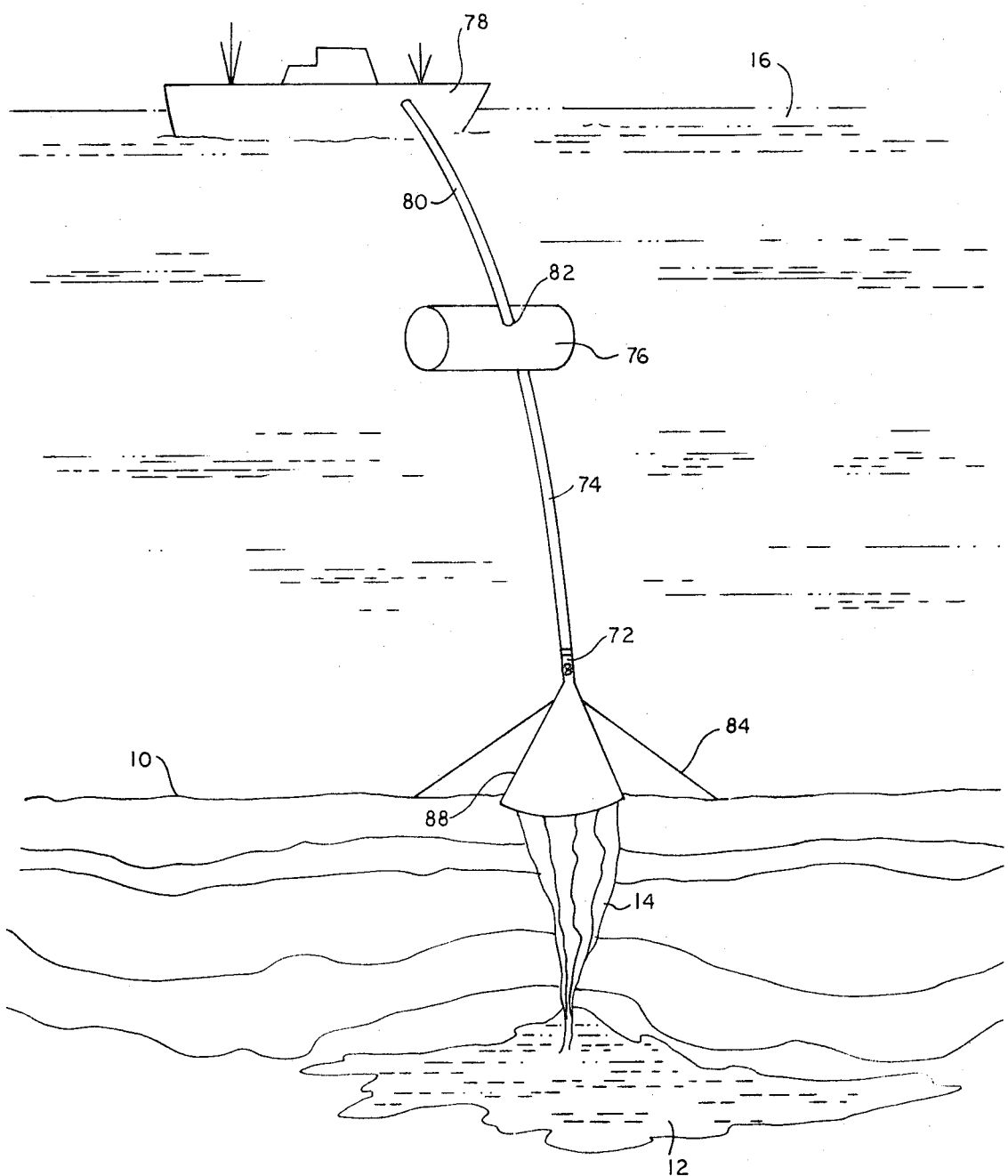
FIG. 3 is a schematic view of a system for sealing and recovering the oil leakage from a fissure.

In the embodiment illustrated in FIG. 3, the oil leakage from a fissure is collected and recovered. A hollow dome member 70 is installed on the ocean floor 10 over the opening of the fissure 14. The dome configuration may take the form of an inverted semiellipsoid and can function as a funnel for collection of the oil seepage.

An outlet pipe 72 may be attached to the top of the dome and a conduit 74 connected to the pipe 72 delivers the collected oil to a storage tank 76 which may float on the surface of the water or is submerged just below the water surface 16. The oil collected in storage tank 76 can be periodically transferred to a tanker ship 78 through a pipe 80 which can be connected to a quick coupling 82 on the top of tank 76.

The dome 70 is preferably heavier than water and is anchored to the ocean floor 10 by means cables 84. The dome may be formed of rigid or flexible material. The diameter of the dome is wider than the largest dimension of the fissure. The dome 70 is placed over the fissure 14, is anchored with cables 84 and a sealant is applied to the outer rim of the dome 70 to form a seal 88 between the dome 70 and the ocean floor 10.

The resin-forming liquids may be of many types but preferably are selected from the preformulated polymerizing systems disclosed in my copending application Ser. No. 843,902, filed June 25, 1969, the disclosure of which is incorporated herein by reference. The formulations include a polyol component, preferably containing a hydroxyalkyl substituted tertiaryamine, a polyol reactive resin and a mixture of nonionic surfactants. When these ingredients are combined in the presence of oil they polymerize and react with and bind up to 70 percent by weight of oil to form a solid mass which can function to seal or plug a fissure.

The preformulated polymerizing system is adapted to compensate for properties of a wide variety of oils and is formulated such that merely by changing the ratio of components or adding other ingredients thereto, the properties and curing time of the final solidified material is varied at will.

During the reaction at room temperature, the mixture first changes color, increases in viscosity and changes color again during a moderate distinctly exothermic reaction phase. The exothermic reaction is controllable. After a time period which may be as short as 10 to 20 seconds a rigid mass is produced. The resultant solid mass will not dissolve readily in most solvents. This product has been tested at 300° F. in a complete vacuum and no oil was found to be extracted from the substance. It has been ground, crushed and treated with acids without any evidence of oil extraction. Numerous tests have been conducted to show that the end product is resistant to fungus, acids, solvents, salt water, marine life and thus is an extremely stable material even though it is of an organic nature.

In a first embodiment of the invention the preformulated polymerizing agent contains polyol, a combination of surfactants and optionally a foam control agent such as a silicone. The polyol is provided by a mixture of materials at least a portion being formed of a nitrogen containing polyol, for example, a hydroxyalkyl substituted polytertiary amine. Tertiary amines of this nature are disclosed in U.S. Pat. No. 2,697,118. It is also believed to function as a catalyst for the resin cross-linking reaction.

The preformulated polymerizing agent generally contains 30 to 80 percent nitrogen containing polyol and preferably 45 to 70 percent of this ingredient. The agent further includes 0 to 5 percent of a silicone oil, up to 15 percent of a mixture of surfactants and 10 to 30 percent of further polyols, such as hydroxyl terminated polyesters, fatty acid glycerides having a hydroxyl number of at least 50 and polyethers such as polyethylene glycol.

The surfactants are preferably a combination of a water soluble surfactant and an oil soluble surfactant. Suitably the surfactants may both be of a nonionic type. For example, a class of surfactants which are fatty partial esters of sorbitol anhydride are generally insoluble or dispersible in water and are soluble in most organic solvents. A specific example, Span 20, sorbitan monolaurate, is a nonionic surface active agent having a hydrophilic-lipophilic balance (HLB) of 8.6.

The second surfactant can also be nonionic, a suitable class of agents being polyoxyethylene derivatives of sorbitan monolaurate such as Tween 21 which is generally soluble or dispersible in water and fairly insoluble in organic liquids. Tween 21 has an HLB value of 13.3.

A very important property of surfactants is the hydrophilic-lipophilic balance values (HLB) which is an expression of the relative simultaneous attraction of an emulsifier for water and for oil. It is preferred that the HLB value of the surfactant insoluble or dispersible in water be below 10 and value of the surfactant soluble in water be above 10. These surfactants are utilized in about equal proportions. However, by having the water insoluble surfactant predominate the product may be rendered of more oleophilic character.

The preformulated polymerizing agent can optionally include a foam regulating agent such as a silicone oil typically a polydimethylsiloxane having a viscosity ranging from 1 to 100,000 cs. These fluids are commercially available and a suitable material is DC 201 (DOW CORNING). Faster polymerization rates are achieved by adding catalysts such as tin octoate.

The polymerizing agent comprising the polyols, the two types of surfactants and the cell size control agent when formulated together provides the basis of the controlled polymerization system which compensates for wide variations in the properties of the fuel oil and the resin.

The resins may be of many types such as isocyanate terminated resins, carboxyl terminated resins, amino terminated resins, hydrocarbon resins such as polystyrene or polyethylene and the like. It is preferred to use a polyol reactive resin such as polyisocyanate. The isocyanate may be of aliphatic or aromatic character. Samples of suitable polyisocyanates are benzene 1,3-diisocyanate and hexane 1,6-diisocyanate.

The resin materials readily polymerize in the presence of both water and crude oil to form oil impervious seals or plugs for fissures. The solidified material exhibits excellent bonding strength to rocky or sandy bottoms. Test cylinders containing 95 percent sand exhibit a compactive force of 715 p.s.i. The material exhibits a bonding strength of 275 p.s.i. to concrete. The material has a compressive strength of 4,700 p.s.i. after 4 hours and 6100 p.s.i. after 28 days. Tensile strength of the material is about 8,000 p.s.i.

It is to be understood that only preferred embodiments of the invention have been described and that numerous substitutions, alterations and modifications are permissible without departing from the spirit and scope of the invention as defined in the following claims.

I claim:

1. A system for controlling an oil leaking fissure on the ocean floor comprising in combination:
    a water-borne craft;
    reservoir means mounted on said craft containing a supply of resin forming liquid; and
    supply means for delivering said liquid from said reservoir to said fissure to form a resinous solid sealant mass, impervious to oil and adherent to the walls of said fissure,
    and a slant channel drilled into the fissure at a location below the ocean floor and said supply means delivers the liquid to the fissure through said channel.

2. A method of sealing oil leaking fissures on the bottom of the ocean floor comprising the steps of:
    drilling a slant channel into the fissure at a location below the ocean floor,
    applying to the fissure an oleophilic resin-forming liquid composition at said location; and
    curing the liquid in place in the fissure to form a solid, oil impermeable seal adherent to the walls of the fissure.

3. A method according to claim 2 in which the fissure lies adjacent a ruptured well casing, the slant channel is drilled into the casing below the rupture and the liquid is fed through the channel into the casing.

4. A method of sealing oil leaking fissures on the bottom of the ocean floor comprising the steps of:
    applying to the fissure a reactive liquid composition comprising mixture of a polyol, a polyol reactive resin and a mixture of nonionic surfactants, and
    curing the liquid in place in the fissure to form a solid, oil impermeable seal adherent to the walls of the fissure.

* * * * *